(12) United States Patent
Rudolph et al.

(10) Patent No.: US 7,756,369 B2
(45) Date of Patent: Jul. 13, 2010

(54) OSNR MONITORING APPARATUS AND METHOD USING POLARIZATION SPLITTING

(75) Inventors: Georg Rudolph, Tübingen (DE); Eberhard Loecklin, Reutlingen (DE)

(73) Assignee: Acterna LLC, Germantown, MD (US)

( * ) Notice: Subject to any disclaimer, the term of this patent is extended or adjusted under 35 U.S.C. 154(b) by 418 days.

(21) Appl. No.: 11/947,191

(22) Filed: Nov. 29, 2007

(65) Prior Publication Data

US 2008/0124076 A1    May 29, 2008

Related U.S. Application Data

(60) Provisional application No. 60/867,682, filed on Nov. 29, 2006.

(51) Int. Cl.
*G02B 6/28* (2006.01)
(52) U.S. Cl. .......................................... 385/24; 385/15
(58) Field of Classification Search .................. 385/15, 385/24
See application file for complete search history.

(56) References Cited

U.S. PATENT DOCUMENTS

| | | | |
|---|---|---|---|
| 6,643,064 B2 * | 11/2003 | Huang et al. ................. | 359/497 |
| 6,690,468 B1 | 2/2004 | Benzel et al. | |
| 7,027,198 B2 * | 4/2006 | Yao .............................. | 359/259 |
| 2003/0219250 A1 | 11/2003 | Wein et al. .................... | 398/26 |
| 2004/0114923 A1 | 6/2004 | Chung | |

FOREIGN PATENT DOCUMENTS

WO    03/055107    7/2003

OTHER PUBLICATIONS

Rasztovits-Wiech et al., "Optical Signal-to-Noise ratio measurement in WDM Networks Using Polarization Extinction", $24^{th}$ European Conference on Optical Communication. ECOC '98, vol. 1, Sep. 24, 1998, pp. 549-550.

* cited by examiner

*Primary Examiner*—Jennifer Doan
(74) *Attorney, Agent, or Firm*—Matthew A. Pequignot; Pequignot + Myers LLC

(57) ABSTRACT

A method and apparatus is disclosed for measurement and monitoring of in-band optical signal to noise ratio (OSNR). A two channel optical spectrum analyzer (OSA) is advantageously applied in acquiring wavelength division multiplex (WDM) signal data after it has been split according to polarization, then deriving the in-band OSNR from acquired data due to its narrow bandwidth, selective spectral shape, and capability to analyze two components of a polarized signal simultaneously. The in-band OSNR can be measured without interrupting optical transmission traffic in the network.

11 Claims, 11 Drawing Sheets

US 7,756,369 B2

OSNR MONITORING APPARATUS AND METHOD USING POLARIZATION SPLITTING

CROSS-REFERENCE TO RELATED APPLICATIONS

The present invention claims priority from U.S. Provisional Patent Application No. 60/867,682 filed Nov. 29, 2006, which is incorporated herein by reference.

TECHNICAL FIELD

This disclosure is concerned with wavelength division multiplex optical communication systems, in particular with a method for measuring in-band optical signal to noise ratio (OSNR).

BACKGROUND OF THE INVENTION

Optical signal to noise ratio (OSNR) is a key performance parameter in wavelength division multiplex (WDM) optical networks to predict the bit error ratio (BER) of the system. It is the ratio of the useful signal to noise. Prior art OSNR measurements and calibration have made use of the interpolation method.

In the interpolation method, OSNR for a given optical channel is obtained by measuring a total signal power and a noise power in a passband associated with the optical channel. Typically, the noise is dominated by amplifier spontaneous emission (ASE) noise generated within optical amplifiers in the optical network. ASE may be measured in spectral gaps either side of the optical channel, normalized to 0.1 nm bandwidth. This is called the linear interpolation method because the noise power is averaged from the values of ASE noise present to the left and to the right of the optical channel.

FIG. 1 shows a representative prior art WDM spectrum comprising three 10 Gb/s optical channels. The three signal envelopes appear as optical power peaks 102a-102c on a noise background level 101. The passband OSNR 103 is usually estimated from a ratio of an optical power reading $P_{signal}$ of power peak 102b at the center wavelength $\lambda_i$ and an average of noise power measurements $P_{noise\_L}$ 104left and $P_{noise\_R}$ 104right taken either side of the optical channel of interest 102b.

Thus the OSNR can be calculated as:

$$OSNR = \frac{P_{signal}}{\frac{P_{Noise\_L} + P_{Noise\_R}}{2}}$$

For WDM optical networks and all-optical networks (AON), which do not have any optical filters in their optical path, the interpolation method gives an accurate OSNR reading.

However, many networks do include one or several optical filters, such as channel filters and multiplexers, with consequent distortion of the noise spectrum. In AON networks in-line optical filters built into reconfigurable optical add-drop multiplexers (ROADMs) or dispersion compensation fiber Bragg gratings (FBGs) will also suppress the noise in between optical channels.

In dense WDM (DWDM) systems operating at high data rates with modulation formats like RZ, CRZ, CSRZ and similar, the modulation bandwidth can be so high that the modulation bands overlap the spectral gaps between the optical signal channels. Under such conditions the ASE noise power is not directly accessible in the inter-channel spectral gap.

The measurement of the noise power in the inter-channel spectral gaps, used by the OSNR interpolation method, will not give an accurate indication of the noise present at the channel wavelength. Under such conditions the interpolation method is no longer reliable for producing accurate measurements.

FIG. 2 shows a representative prior art WDM spectrum comprising two optical channels modulated at 10 Gb/s with the two signal envelopes appearing as optical power peaks 202a and 202b on a noise background level 201. Using the interpolation method, an interpolated OSNR 204 is obtained. However, the actual noise level within the passband is given by curve 205b so that the actual in-band OSNR 203 is substantially smaller than the interpolated OSNR 204. The reason is that the noise spectrum e.g. of ASE noise is no longer flat, but is distorted by cumulative filter characteristics 206a, 206b of the in-line filters mentioned above.

There are a number of alternative ways for accurately determining OSNR in systems such as those mentioned above.

The time resolved optical gating (TROG) method involves signal deactivation. The channel signal is switched off or blanked for a duration sufficiently short in order not to permit gain levels of optical amplifiers in the WDM optical network to be affected. During the blanking, the in-band noise level is measured. The OSNR is then derived from the in-band noise level and the power in the channel with the signal present. There are major drawbacks with this method. It cannot be performed in a live system without service interruption, which makes it unsuitable for routine monitoring.

In addition, blanking the channel signal can cause instability of ASE noise, as automatic gain control in the optical amplifiers may change the ASE noise level when the signal is switched off. The noise power level reading may be rendered inaccurate in this situation, yielding an inaccurate OSNR value.

Another method is based on the recognition that the noise, principally ASE noise, has a random polarization, whereas useful signals have a definite polarization. Thus, by determining the polarization of a particular signal in an optical channel, optical power measurement at the orthogonal polarization may be used to estimate the in-band noise level $P_{Noise\_in-band}$. The noise level can then be subtracted from the combined signal and noise power measured at the useful signal polarization to obtain the signal power $P_{signal}$. From the two resulting values, the OSNR is calculated from the equation:

$$OSNR = \frac{P_{signal}}{P_{Noise\_in-band}}$$

In effect, the optical signal is suppressed to permit the noise power at the signal-wavelength to be measured. This in-band OSNR testing principle is sometimes referred to as polarization controlling or nulling.

Prior art OSNR monitoring apparatus making use of this principle has been disclosed by Chung (US Patent Application 20040114923), as shown in FIG. 3.

An optical WDM signal is introduced into a polarization controller 22, from where it is passed through a tunable optical bandpass filter 24 and split into two components by a polarization separator 42 along paths Path3 and Path4. Each component is converted to an electric signal by photodetectors 30a and 30b whose output is converted into digital form by analog-digital converters 32a and 32b respectively, which feed into a power calculator 34 followed by an OSNR calculator 36.

For each wavelength setting of the tunable optical bandpass filter 24 a corresponding polarization state of a signal can be determined by varying the state of the polarization controller 22, thereby permitting appropriate polarization splitting to be accomplished.

The apparatus of Chung presents certain disadvantages. Since it is difficult to make a tunable filter with high dynamic range that has a single mode fiber (SMF) output and narrow bandwidth, in practice SMF pigtailed elements such as polarization controller 22, polarization separator 42 or photodiodes 30a, 30b cannot be readily coupled to the output of tunable optical bandpass filter 24 without incurring considerable insertion loss.

SUMMARY OF THE INVENTION

An object of the present invention is to provide an optical signal to noise ratio (OSNR) monitoring method and apparatus for a wavelength division multiplex (WDM) optical transmission system, based on a dual-channel tunable filter using a polarization splitting principle for scanning a range of optical wavelengths.

The dual-channel tunable filter is disposed after a polarization splitter within an optical train of the OSNR monitoring apparatus, thereby permitting free-space coupling of the dual-channel tunable filter to two photodiodes at the end of the optical train. Because the tunable filter has to pass light of only one given polarization orientation, the effect of already small polarization dependent losses of the tunable filter are further reduced.

A further object of the present invention is to provide an OSNR monitoring apparatus and method capable of determining the OSNR with improved accuracy using optical power measurements at different polarizations and wavelengths by a suitable choice of wavelength offsets from channel center wavelengths.

In accordance with one aspect of the present invention, a polarization controller at an input of the OSNR monitoring apparatus enables a rotation of the polarization of the input signal over all polarization orientations. The polarization orientation angle is varied by a central processing unit (CPU) for each wavelength scan of the dual-channel tunable filter.

Another aspect of the present invention provides for a polarization splitter to separate a WDM signal and noise into two lightpaths, P and S, which are detected simultaneously after passing through the dual-channel tunable filter. By processing signals from the P and S lightpaths for several wavelength scans of the dual-channel tunable filter, a value for in-band OSNR in each signal channel of the WDM signal can be determined.

BRIEF DESCRIPTION OF THE DRAWINGS

The invention will be described in greater detail with reference to the accompanying drawings which represent preferred embodiments thereof, wherein.

DETAILED DESCRIPTION

To achieve the objects of the present invention, an apparatus and method is disclosed based on a principle of polarization splitting or nulling with the advantage that it is suitable for live signal in-band OSNR monitoring without the need for service interruption.

Figure 4:
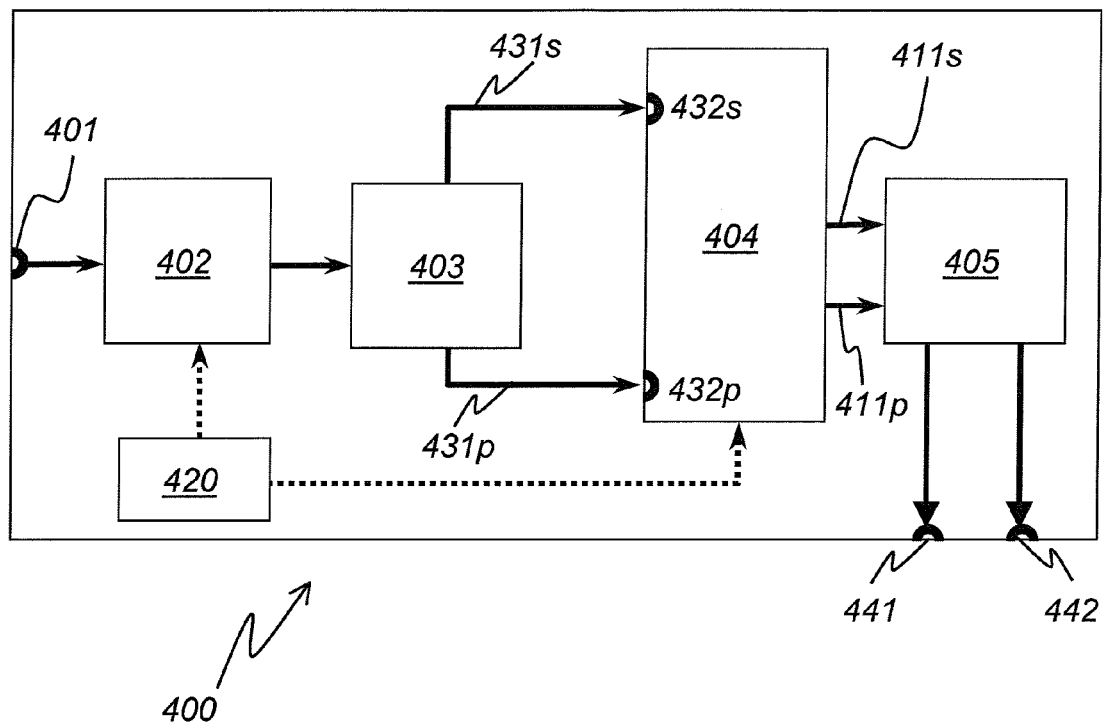
FIG. 4 is a schematic diagram of an OSNR monitoring apparatus according to the present invention.

A first embodiment is shown in a simplified block diagram in FIG. 4. The in-band OSNR monitor 400 comprises a polarization controller 402 for receiving a WDM signal via input port 401. The polarization controller 402, controlled by a central processing unit (CPU) 420 is capable of varying the polarization orientation of the WDM signal over all polarization orientations.

From the polarization controller 402 the WDM signal is passed to a polarization filter or splitter 403, where it is divided into two orthogonally polarized WDM signals 431p and 431s. Each of the orthogonally polarized WDM signals 431p and 431s is input into an optical spectrum analyzer (OSA) 404 where they are filtered by a narrow passband filter with variable center wavelength and converted simultaneously to electrical signals 411p and 411s by means of suitable photodetectors. The two electrical signals 411p and 411s correspond to an optical power in the respective orthogonally polarized WDM signals 431p and 431s, respectively. The CPU 420 can also be used to control scanning of the center wavelength of the narrow passband filter in the OSA 404, which can be a standard OSA capable of measuring the optical power of two input signals simultaneously rather than sequentially. For example, a suitable dual-port OSA has been disclosed by Benzel et al. (U.S. Pat. No. 6,690,468), which is included here by way of reference. The bandwidth of the narrow passband filter in the OSA 404 is preferably narrower than the signal channel bandwidth to enable more than one measurement to be taken for each signal channel.

A signal processing unit 405 receives the electrical signals 411p and 411s. Typically the center wavelength of the narrow passband filter in the OSA 404 is repeatedly scanned over a wavelength range of interest while stepping through many different polarization rotation settings of the polarization controller 402. Alternatively, the polarization rotation settings of the polarization controller 402 may be repeatedly scanned over a Poincare polarization space while stepping through different values of center wavelength of the narrow passband filter in the OSA 404 over a wavelength range of interest. In both cases, values of the electrical signals 411p and 411s are compiled in a suitable form, such as a table in digital memory, for each scanned center wavelength and polarization rotation setting of the polarization controller 402.

The signal processing unit 405 applies mathematical algorithms to the compiled values to extract required features of the WDM signals, such as signal summation, ratio, running minima and/or maxima, for calculating a signal power 441 and noise power 442, from which the OSNR of signal channels within the scanned wavelength range may be obtained.

The advantage of locating the OSA 404 after the polarization splitter 403 lies in the freedom to couple the two orthogonally polarized WDM signals 431$p$ and 431$s$ after being filtered by the narrow passband filter directly or via large diameter fiber to the last elements in the optical train, the photodetectors which output electrical signals 411$p$ and 411$s$. Thus while the polarization controller 402 and polarization splitter 403 can be standard single mode fiber (SMF) coupled elements, the output from the dual-port OSA 404 does not need to go back to a single mode fiber. It is difficult to make a tunable filter with high dynamic range that has a SMF output and narrow bandwidth. So it is easier to pass signals through the simpler elements without internal mechanisms first before passing them through the more complicated element, namely the OSA 404 (particularly if it is a dual-port OSA), to the photodetector. While it may not be obvious that employing a dual channel filter carries no cost penalty, the present invention capitalizes on proprietary technology which provides a dual channel filter at the same cost as a single channel filter. Using two separate filters would, of course, create much more costs with little or no advantage.

The measurement principle is based on the fact that optical transmission signals are polarized in an arbitrary orientation, whereas noise such as amplifier spontaneous emission (ASE) noise is randomly polarized.

The polarization controller 402 and polarization splitter 403 can separate the polarized signal from the randomly polarized ASE noise. Depending on the setting of the polarization controller 402, the polarization splitter 403 will divide the optical channel power according to polarization state and transmit each part to its appropriate output. On the other hand the polarization splitter 403 will always pass half of the randomly polarized ASE noise to each of its outputs.

A special processing unit, not shown, evaluates the ASE noise power and signal power. The measurement of the total channel power and the calculation of the ASE noise power within the optical system filter bandwidth gives the 'in-band' OSNR. The method, called optical polarization splitting (OPS-OSA) method, assumes that ASE noise induced in the system by optical amplifiers has random polarization.

Figure 5:
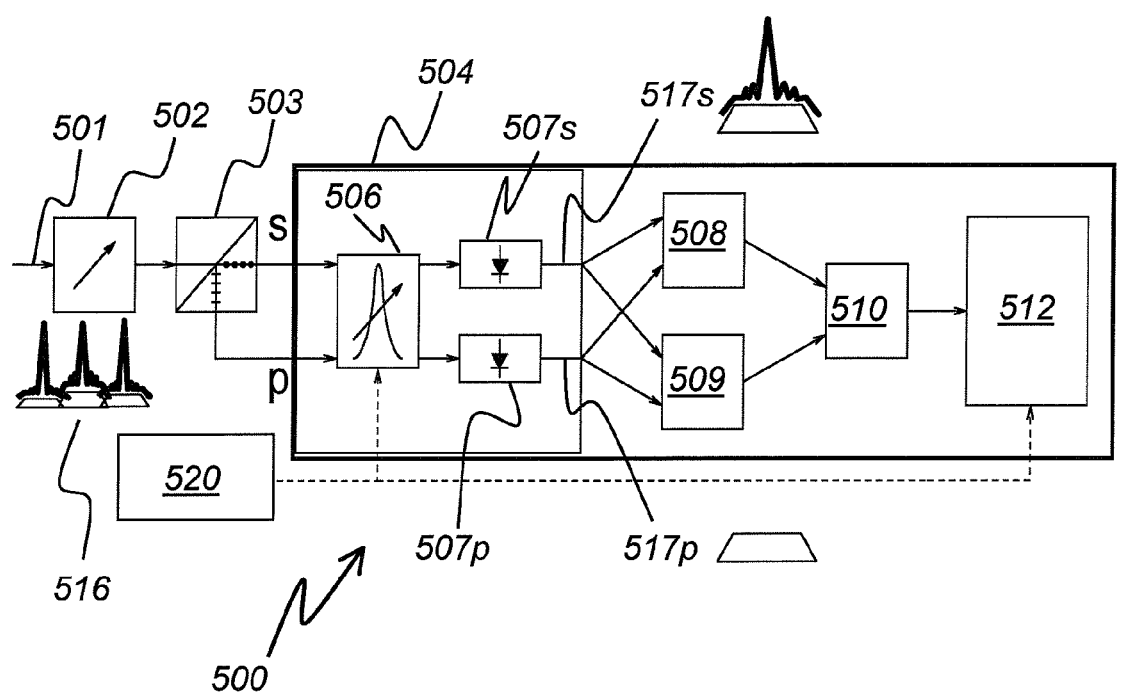
FIG. 5 is a more detailed schematic diagram of an OSNR monitoring apparatus according to the present invention.

A second embodiment of the present invention is shown in FIG. 5. The in-band OSNR monitor 500 comprises a polarization controller 502 for receiving a WDM signal 506 (only 3 representative channels shown) via an input port 501. The polarization controller 502, controlled by a central processing unit (CPU), not shown, is capable of rotating the polarization orientation of the WDM signal 506 over all polarization orientations.

From the polarization controller 502 the WDM signal 506 is passed to a polarization splitter 503, where it is divided into two orthogonally polarized WDM signals p and s. Each of the orthogonally polarized WDM signals p and s is input into a dual-port OSA 504, comprising a dual-channel tunable filter 506 whose output is fed into two photodetectors 507$p$ and 507$s$, respectively. The photodetectors 507$p$ and 507$s$ produce corresponding electrical signals at photodetector outputs 517$p$ and 517$s$, respectively. The bandwidth of the dual-channel tunable filter 506 is narrower than the signal channel bandwidth to enable more than one measurement to be taken for each signal channel.

In operation, the dual-port OSA 504 is made to scan over a predetermined range of wavelengths by scan controller 520, while polarization orientation is rotated by means of the polarization controller 502 for each wavelength scan of the dual-port OSA 504. Preferably for each wavelength scan of the OSA 504, only one polarization setting of the polarization controller 502 is used. In general, to cover all the required polarization orientations for a complete OSNR measurement of the WDM signal 506, a sufficient number of scans is required, in practice exceeding about 100 scans. It is important to measure both signals at the outputs 517$p$ and 517$s$ of the two photodetectors 507$p$ and 507$s$ simultaneously while scanning over the wavelength range, as the power in the orthogonally polarized WDM signals p and s can change with time. Sequential measurement could therefore introduce errors.

When the polarization controller 502 is adjusted so that only the ASE noise 517$p$ appears at an output of one of the photodetectors, for instance photodetector 507$p$, at the output of the other photodetector 507$s$ a channel signal 517$s$ will become available.

A summation unit 508 performing an addition of the electrical signals $P_e$ and $S_e$ at the outputs 517$p$ and 517$s$ of photodetectors 507$p$ and 507$s$ in the dual-port OSA 504 is used to display a trace of the total signal on a display unit 512, which is also controlled by the scan controller 520 (similar to a conventional OSA):

$$\text{Signal}=(P_e+S_e)$$

A 'minimum-hold' function 509 in the dual-port OSA 504 will internally detect and store the minimum values $P_{min}$ and $S_{min}$ for $P_e$ and for $S_e$, respectively, to finally display the minimum values for all the polarization states as adjusted by the polarization controller 502. The minimum of both $P_{min}$ and $S_{min}$ will display a trace with maximally suppressed optical signal channels on the display unit 512.

A subtraction unit 510 is used to calculate a ratio by performing division in the logarithmic domain.

The standard method to measure OSNR can now be applied by measuring the noise power at a wavelength offset left and right of the channel center wavelength $$\text{Noise}=\min(P_{min}, S_{min})$$

Finally, in-band OSNR is calculated using the approximate equation:

$$OSNR = \frac{\text{Signal}}{\text{Noise}} = \frac{P+S}{\min(P_{min}, S_{min})}$$

In a third embodiment, the dual-port OSA 504 is replaced by two single-port optical spectrum analyzers, whose wavelength scanning is arranged to permit simultaneous measurement of the two orthogonally polarized WDM signals p and s. Simultaneous measurements have the advantage of reducing errors in the OSNR measurement arising from the effects of polarization mode dispersion.

Alternatively, in a fourth embodiment, the dual-port OSA 504 can be replaced by a separate dual-channel tunable filter 506 whose output is fed into two photodetectors 507$p$ and 507$s$.

The sum of the power represented at the outputs 517$p$ and 517$s$ of photodetectors 507$p$ and 507$s$ is at every moment equal to the total power (Signal+ASE) at any instantaneous wavelength and independent of the SOP setting of the polarization controller 502, whereby the spectral information is immediately available with the first scan, as with a conventional optical spectral analyzer.

Figure 6A:
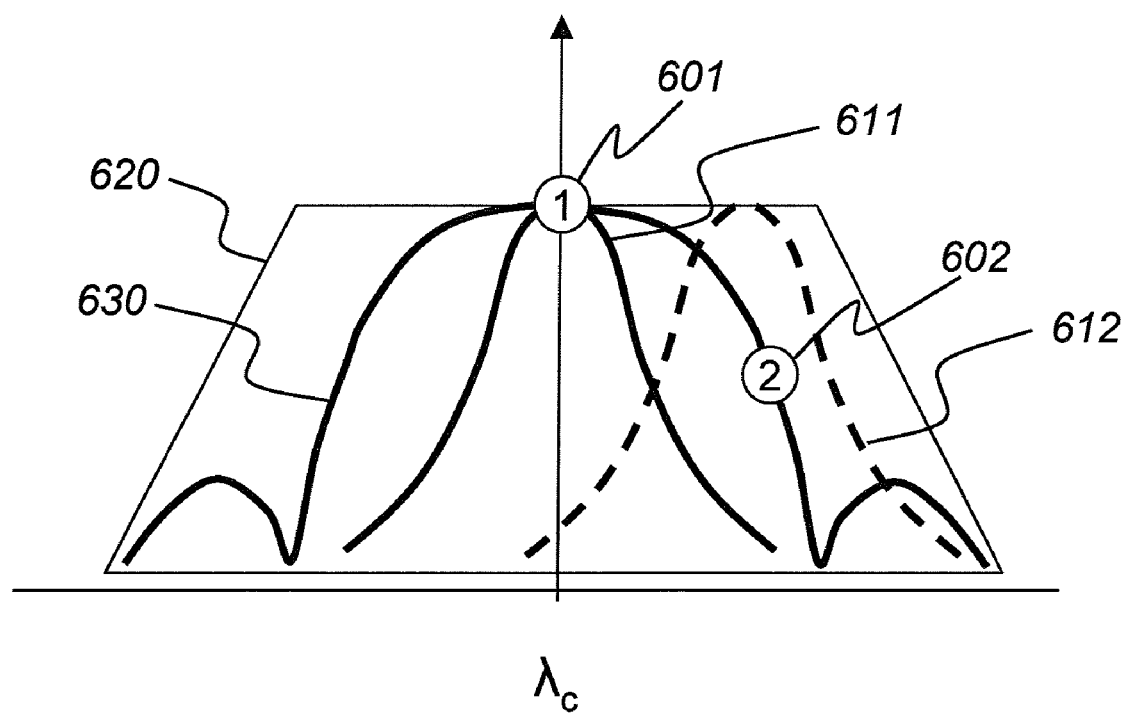
FIGS. 6a-6c illustrate the choice of wavelength offset for reducing OSNR measurement error due to polarization crosstalk.

Measurement errors due to polarization cross-talk require special attention. By avoiding measurements at a peak power of channel signals this problem can be largely mitigated. A method to achieve this is illustrated in the spectrum shown in FIG. 6a.

Figure 1:
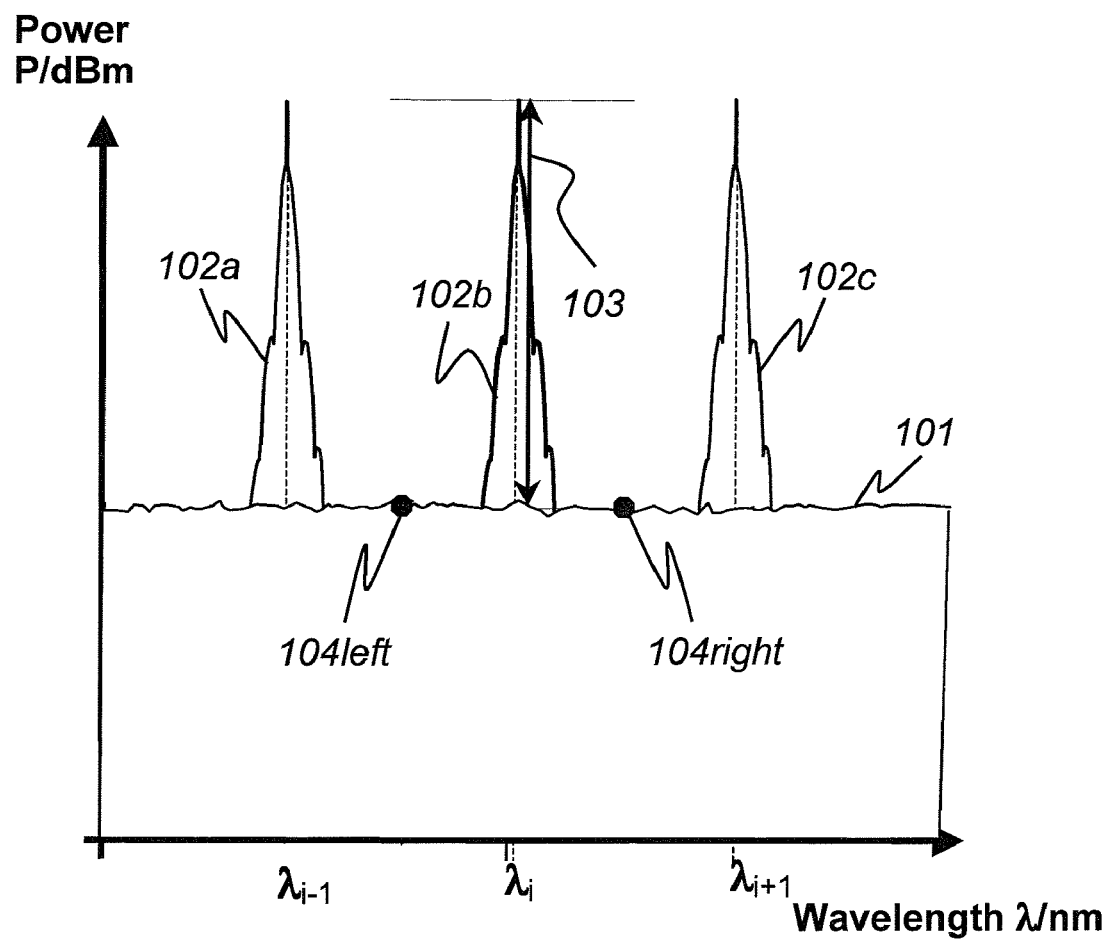
FIG. 1 is a prior art optical WDM spectrum illustrating the linear interpolation method.
Figure 2:
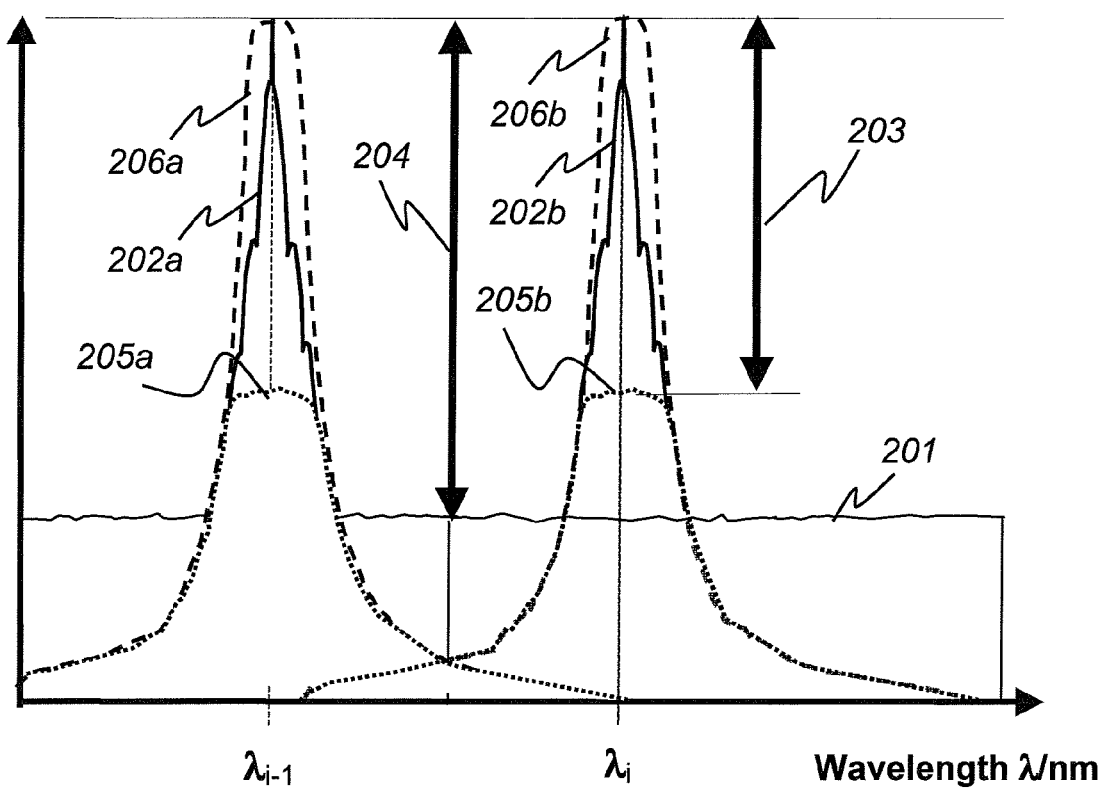
FIG. 2 is a prior art optical WDM spectrum showing the effect of filtered noise, which results in a different noise power within the signal bandwidth than in the gaps between optical channels.
Figure 3:
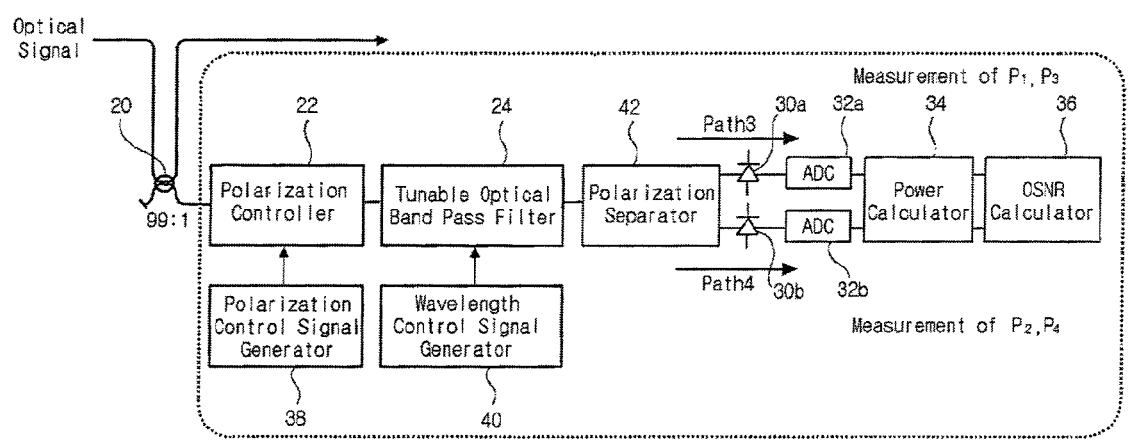
FIG. 3 is a prior art schematic diagram of an OSNR monitoring apparatus.

A spectral envelope of optical signal 630, centered on a center wavelength $\lambda_c$, is enclosed by a channel filter spectral envelope 620 resulting from the various filters within the optical transmission system as mentioned before. A filter characteristic 611 of the dual-channel tunable filter 506 from FIG. 5 is shown positioned at the center wavelength $\lambda_c$ at a measurement point 601. Since the optical signal 630 is at a peak value at this point, it may produce a noticeable distortion of the ASE background (for instance 205b in FIG. 2) through polarization cross-talk. By offsetting the filter characteristic 612 of the dual-channel tunable filter 506 to a measurement point 602, the effects of polarization cross-talk can be substantially reduced.

Figure 6B:
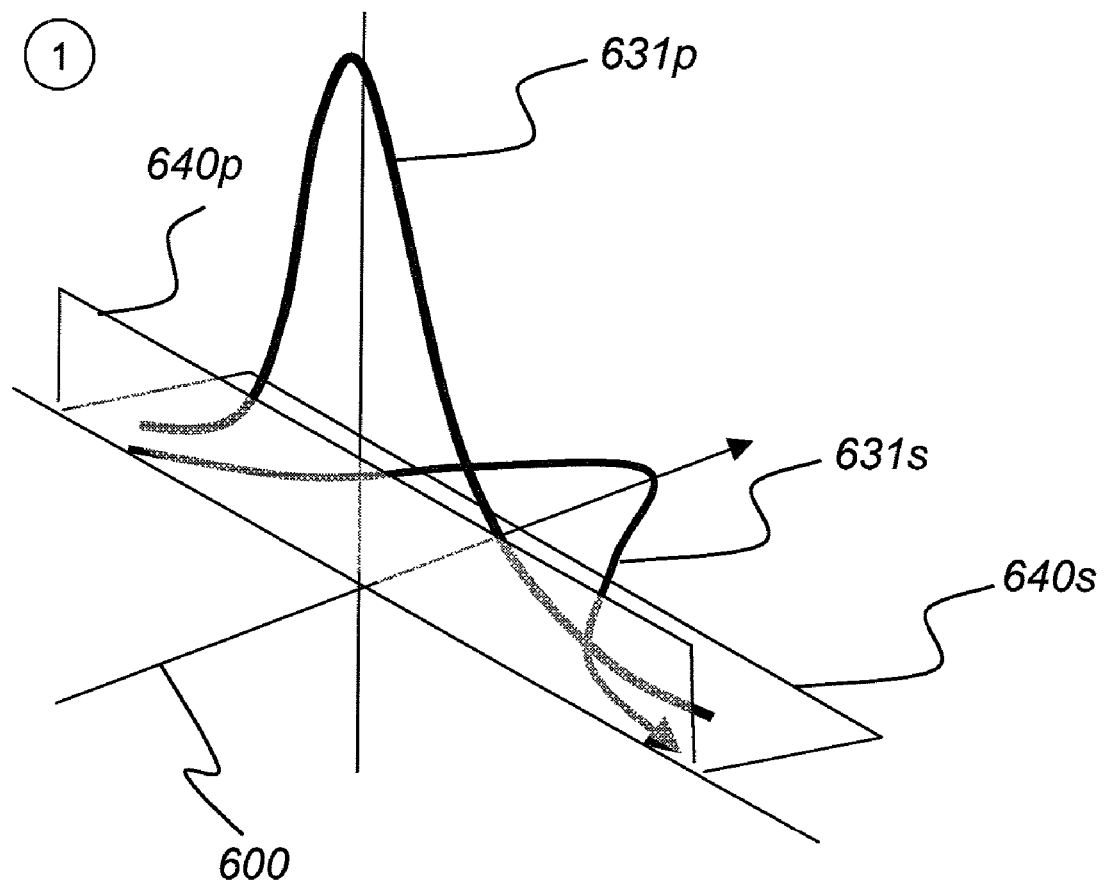

A further illustration of this technique appears in FIG. 6b. A spectrum of a first polarization peak 631p of the optical signal 630 measured at the center wavelength $\lambda_c$ measurement point 601 and at a maximum setting is represented superimposed on a first ASE power spectrum 640p in a plane perpendicular to direction 600. Ideally a corresponding orthogonally polarized spectrum parallel to direction 600 would show only the ASE power spectrum 640s. However, due to polarization cross-talk, the first polarization peak 631p produces an orthogonally polarized peak 631s on top of the ASE power spectrum 640s.

Figure 6C:
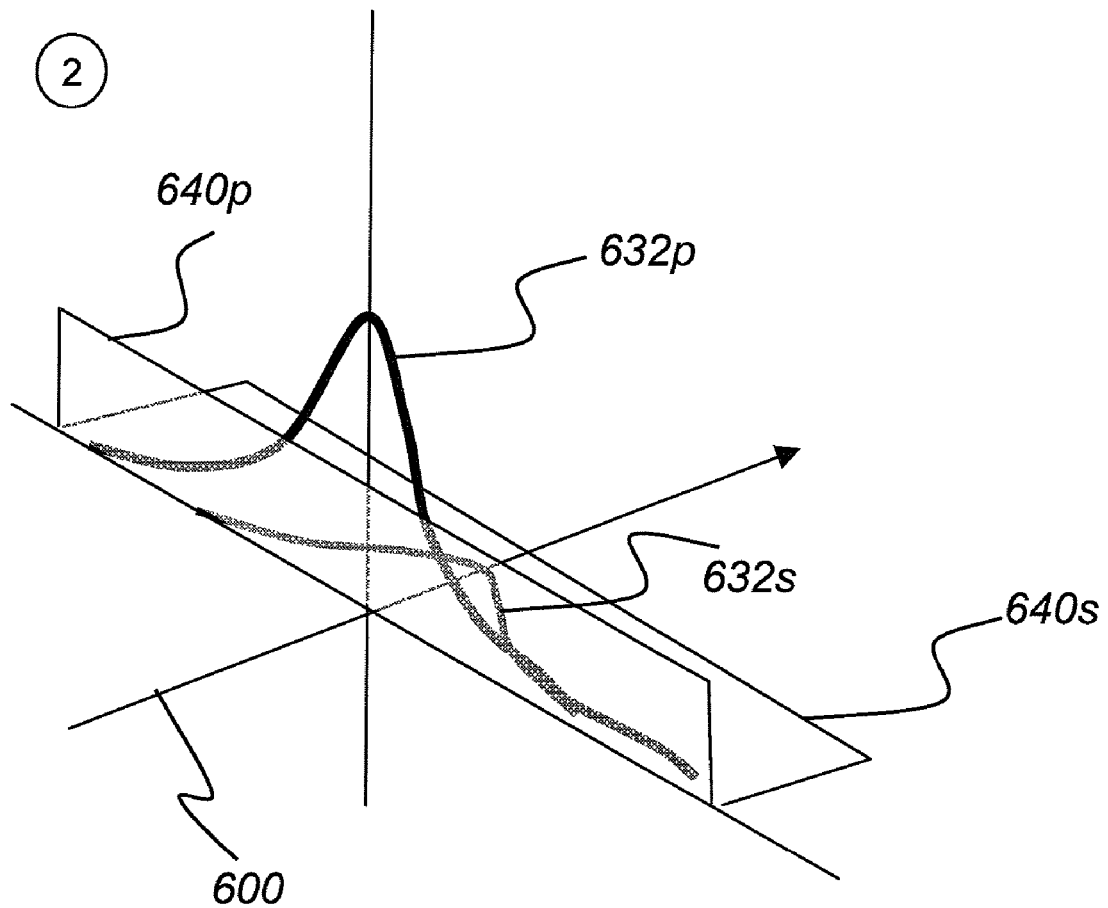

When the filter characteristic 612 of the dual-channel tunable filter 506 is offset to a measurement point 602, a spectrum of the first polarization peak 632p of the optical signal 630 at a maximum setting again appears superimposed on the first ASE power spectrum 640p. However, in this case the corresponding orthogonally polarized spectrum shows only the ASE spectrum 640s, since the polarization cross-talk peak 632s is below the ASE power spectrum 640s, as illustrated in FIG. 6c.

Figure 7:
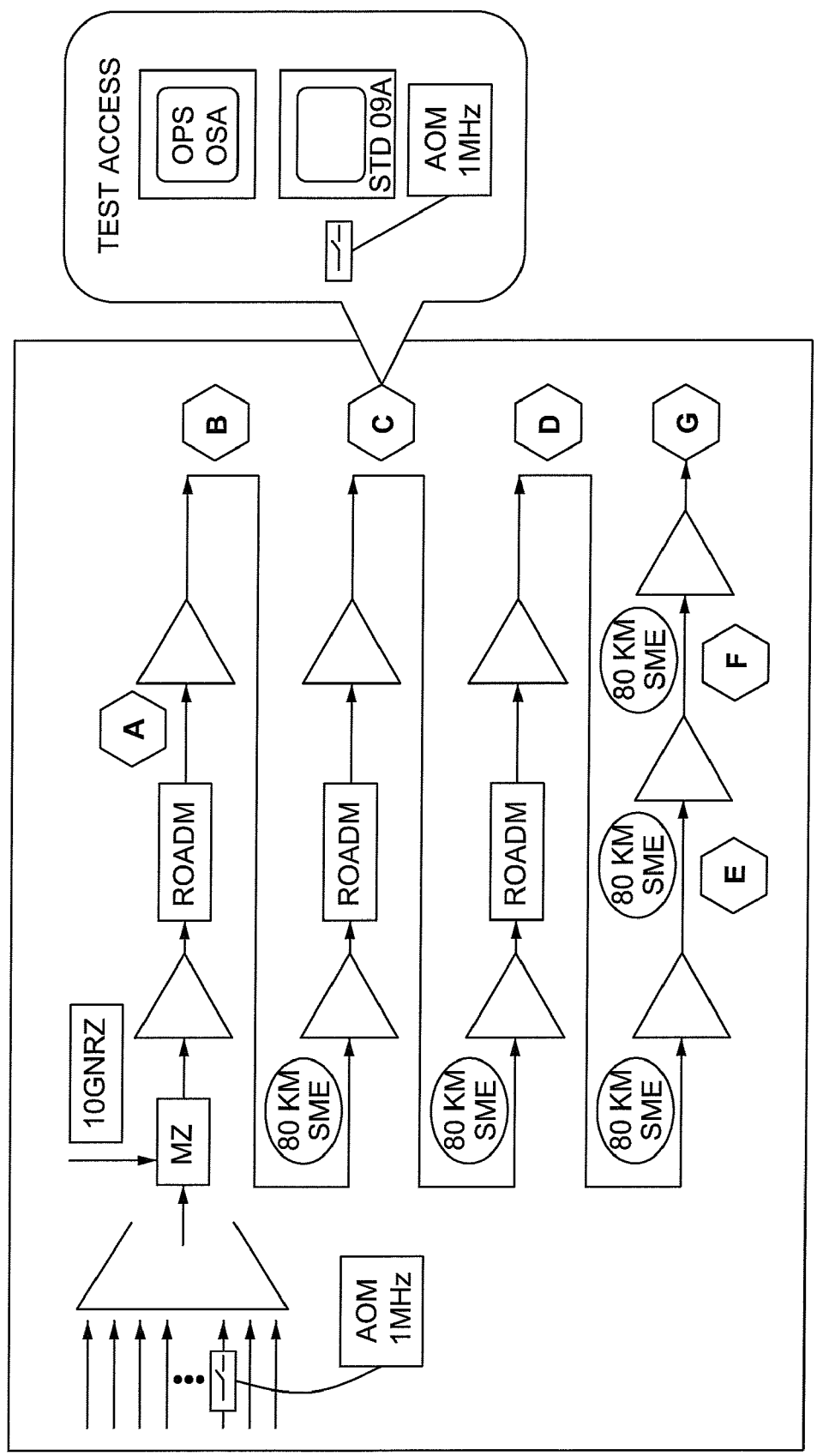
FIG. 7 is a block diagram an OSNR test setup.

FIG. 7 shows a simplified block diagram of test access points A-G after each amplifier section. Reference OSNR values were measured with the JDSU Inc. TROG method with high speed optical gating. An acousto-optic-modulator (AOM) chopper modulated at 1 MHz at the transmitter (Tx) site was used to switch a 10 Gb/s signal on and off. A second AOM in front of a standard OSA was synchronously triggered. Synchronizing the second AOM to the ON-state made the standard OSA indicate the signal power ($P_{signal}$), whereas synchronizing it to the OFF-state produced an indication of the noise power, which is equal to the in-band noise power ($P_{Noise\_in}$-band).

The high chopper frequency of 1 MHz prevented the optical amplifiers from exhibiting any automatic gain control and amplifier relaxation effects. With this method accurate OSNR measurements could be achieved according to the following formula:

$$OSNR = \frac{P_{signal}}{P_{Noise\_in\_band}}$$

Figure 8:
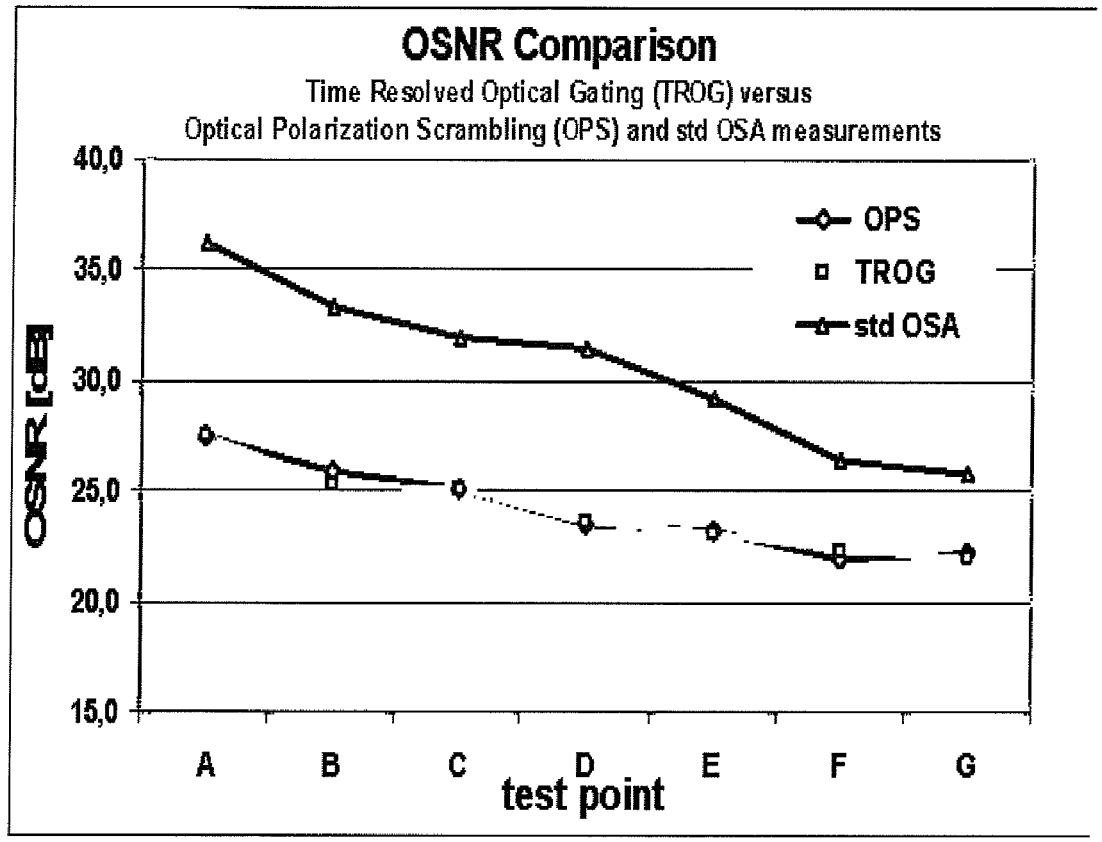
FIG. 8 shows OSNR measurement results performed at each access point of the test setup obtained by three different methods.

FIG. 8 is a graph of measured OSNR in dB versus test access point for three different measurement methods: standard OSA (interpolation method), TROG method with a standard OSA and OPS-method using a JDSU Inc. OPS prototype. The time resolved optical gating method (TROG) was taken as the reference for the 'true' OSNR value. Note—this method can only be applied in systems out of service.

Figure 9:
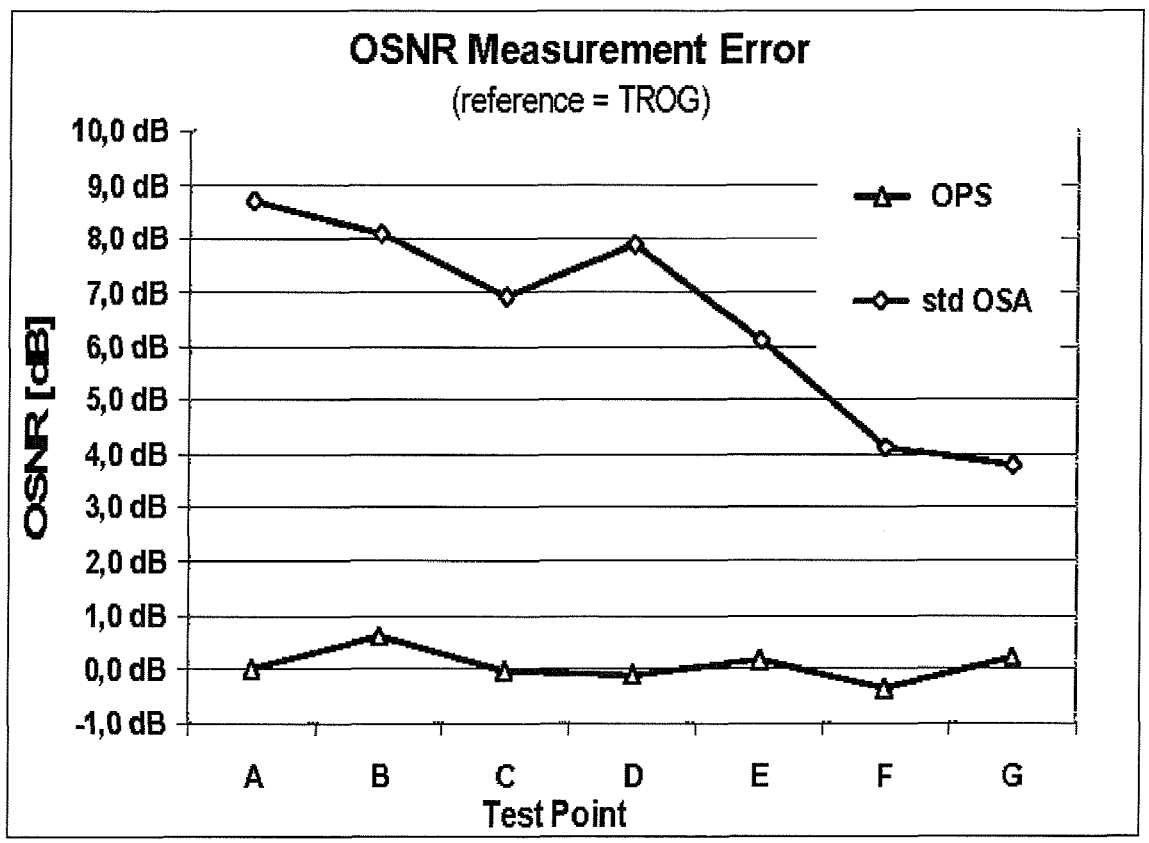
FIG. 9 shows measurement error at each access point of the test setup for three different OSNR measurement methods.

FIG. 9 is a graph of OSNR measurement accuracy in dB versus test access point, referred to the TROG method. The test results show that the standard OSA will always show OSNR values which are too high. This method is based on the noise power in the gaps between the channels which is suppressed by in-line optical filtering. The error can be as high as 9 dB to 10 dB, depending on the system configuration The OPS-OSA method shows very accurate conformance to the TROG reference method. The error was typically in the range <±0.5 dB.

In summary, the measurements of OSNR with the interpolation method used by standard OSAs does not provide accurate measurement results in an AON with in-line optical filters (ROADMs, optical cross-connects (OXC), etc.). The error can be as high as 10 dB.

The new JDSU Inc. OPS-OSA apparatus and method based on the principle of optical polarization splitting for signal elimination has proven that OSNR measurements with a high accuracy of <±0.5 dB can be attained. A major benefit from this method is that it can be used in monitoring live optical systems without the need of service interruption.

We claim:

1. An apparatus for monitoring an optical signal-to-noise ratio (OSNR) of an optical signal having a state of polarization (SOP) in a wavelength division multiplexed (WDM) transmission system, comprising:
    a variable polarization controller for rotating the SOP of the optical signal;
    a polarization beam splitter for splitting the optical signal at each SOP into first and second signal components having orthogonal polarizations;
    an optical power meter for simultaneously measuring a first optical power in a filter passband of the first signal component and a second optical power in the filter passband of the second signal component for each SOP, wherein the filter passband is centered on a measurement wavelength and has a filter bandwidth that is narrower than a bandwidth of the optical signal;
    a control unit for scanning the measurement wavelength over a predetermined wavelength range, and for setting a polarisation rotation of the polarization controller; and
    a signal processing unit for recording values of the first and second optical power, for accumulating a running minima and sum of the first and second optical power, and for calculating the OSNR from the accumulated running minima and sum.

2. The apparatus for monitoring an optical signal-to-noise ratio (OSNR) of claim 1, wherein the optical power meter comprises a dual-channel narrow bandpass tunable filter for filtering the first and second signal components, a first photodiode for responding to the first filtered signal component and a second photodiode for responding to the second filtered signal component.

3. The apparatus for monitoring an optical signal-to-noise ratio (OSNR) of claim 1, wherein the optical power meter comprises a first and a second optical spectrum analyzer, both optical spectrum analyzers synchronized to the measurement wavelength.

4. The apparatus for monitoring an optical signal-to-noise ratio (OSNR) of claim 1, wherein the optical power meter comprises a dual-port optical spectrum analyzer.

5. A method of monitoring an optical signal-to-noise ratio (OSNR) of an optical signal in a wavelength division multiplexed (WDM) transmission system, comprising the ordered steps of:
   a) applying the optical signal to a polarization controller set to a value of polarization rotation for obtaining a rotated polarization signal;
   b) transmitting the rotated polarization signal to a polarization beam splitter for splitting the rotated polarization signal into a first signal component and a second signal component having orthogonal polarizations;
   c) applying the first and second signal components to respective ports of a dual-port optical spectrum analyzer (OSA);
   d) sweeping a center wavelength of the dual-port OSA over a preset wavelength range and at predetermined wavelength values, recording simultaneously a first optical power of the first signal component and a second optical power of the second signal component;
   e) accumulating running minima and a corresponding sum of the first and second optical power in a data table;
   f) repeating steps a) through e) for different values of polarization rotation until the data table is populated; and
   g) deriving the OSNR of desired optical signals in the preset wavelength range of the WDM transmission system from the accumulated running minima and the sum of the first and second optical power.

6. The method of claim 5, wherein the data table comprises at least one measurement of the first optical power and at least one measurement of the second optical power for each predetermined wavelength value and each value of polarization rotation.

7. The method of claim 5, further comprising step i) displaying the OSNR of the desired optical signals on a display device.

8. The method of claim 5, wherein in step a), the value of polarization rotation is varied in a systematic sequence.

9. The method of claim 5, wherein in step a), the value of polarization rotation is varied in a random sequence.

10. A method of monitoring an optical signal-to-noise ratio (OSNR) of an optical signal in a wavelength division multiplexed (WDM) transmission system, comprising the ordered steps of:
   a) applying the optical signal to a polarization controller for obtaining a rotated polarization signal;
   b) transmitting the rotated polarization signal to a polarization beam splitter for splitting the rotated polarization signal into a first and a second signal component having orthogonal polarizations;
   c) applying the first and a second signal components to respective ports of a dual-port optical spectrum analyzer;
   d) setting a center wavelength of the dual-port optical spectrum analyzer to a predetermined wavelength value;
   e) sweeping the polarization controller over a preset range of polarization rotation values and at predetermined polarization rotation values recording simultaneously a first optical power of the first signal component and a second optical power of the second signal component;
   f) accumulating running minima and a corresponding sum of the first and second optical power in a data table;
   g) repeating steps a) through f) for different values of center wavelength until the data table is sufficiently populated; and
   h) deriving the OSNR of desired optical signals in the preset wavelength range of the WDM transmission system from the accumulated running minima and the sum of the first and second optical power.

11. The method of claim 10, wherein the preset range of polarization rotation values comprises an entire Poincare sphere.

* * * * *